(12) United States Patent
Kuver et al.

(10) Patent No.: US 7,555,174 B2
(45) Date of Patent: Jun. 30, 2009

(54) COPLANAR WAVEGUIDE LINE

(75) Inventors: Atul Kuver, Tranmere (AU); Yi Zhou, Darlington (GB)

(73) Assignee: Filtronic, PLC, West Yorkshire (GB)

( * ) Notice: Subject to any disclaimer, the term of this patent is extended or adjusted under 35 U.S.C. 154(b) by 0 days.

(21) Appl. No.: 10/577,500

(22) PCT Filed: Oct. 27, 2004

(86) PCT No.: PCT/GB2004/004515

§ 371 (c)(1), (2), (4) Date: Feb. 5, 2007

(87) PCT Pub. No.: WO2005/052681

PCT Pub. Date: Jun. 9, 2005

(65) Prior Publication Data

US 2007/0242915 A1  Oct. 18, 2007

(30) Foreign Application Priority Data

Oct. 28, 2003  (GB) ................................. 0325095.8

(51) Int. Cl.
*G02F 1/295* (2006.01)

(52) U.S. Cl. .................. 385/4; 385/2; 385/14; 385/40; 385/129; 385/131; 385/132

(58) Field of Classification Search ...... 385/2, 385/4
See application file for complete search history.

(56) References Cited

U.S. PATENT DOCUMENTS

| | | | | |
|---|---|---|---|---|
| 5,119,447 A | * | 6/1992 | Trisno ............................ | 385/3 |
| 5,416,858 A | * | 5/1995 | Riviere .......................... | 385/1 |
| 6,526,186 B2 | * | 2/2003 | Burns ............................ | 385/2 |
| 7,082,237 B2 | * | 7/2006 | Walker et al. .................. | 385/40 |
| 2003/0118267 A1 | * | 6/2003 | Kimber et al. ................ | 385/14 |
| 2006/0120655 A1 | * | 6/2006 | Walker .......................... | 385/9 |

FOREIGN PATENT DOCUMENTS

GB    2384570    7/2003

OTHER PUBLICATIONS

Dagli, Nadir, Wide-Bandwidth Lasers and Modulators for RF Photonics, Jul. 1999, IEEE Transactions on Microwave Theory and Techniques, vol. 47, No. 7, pp. 1163-1164.*
Search Report No. PCT/GB2004/004515 dated May 19, 2005, International filing date Oct. 27, 2004.

(Continued)

*Primary Examiner*—Sung H Pak
*Assistant Examiner*—Chad H Smith
(74) *Attorney, Agent, or Firm*—Howard & Howard Attorneys PLLC

(57) ABSTRACT

A coplanar waveguide line comprising
  a substrate;
  a central electrode strip on the substrate;
  first and second electrode strips disposed on opposite sides of the central electrode strip and extending parallel thereto;
  first and second optical waveguides on the substrate, the optical waveguides being positioned between the first and central electrode strips and extending parallel thereto;
  the central electrode comprising at least one T-rail extending proximate to the first optical waveguide;
  the first electrode comprising at least one T-rail extending proximate to the second optical waveguide;
  the substrate comprising an $n^+$ electrically conducting layer extending between the optical waveguides;
  wherein the coplanar waveguide line further comprises an electrical connection between first and second electrode strips.

12 Claims, 13 Drawing Sheets

OTHER PUBLICATIONS

Publication entitled "Wide-Bandwidth Lasers and Modulators for RF Photonics" by Nadir Dagli, member, IEEE; reprinted from IEEE Transactions on Microwave Theory and Techniques vol. 47 No. 2 Jul. 1999.

Publication entitled "Ultra Wide Electrical Bandwidth GaAs/AlGaAs Electrooptic Modulators" by N. Dagli, R. Spickermann, S. Sakamoto, and M. Peters; reprinted for CH3577 4/95/0000-0251$01.00 1995 IEEE.

* cited by examiner

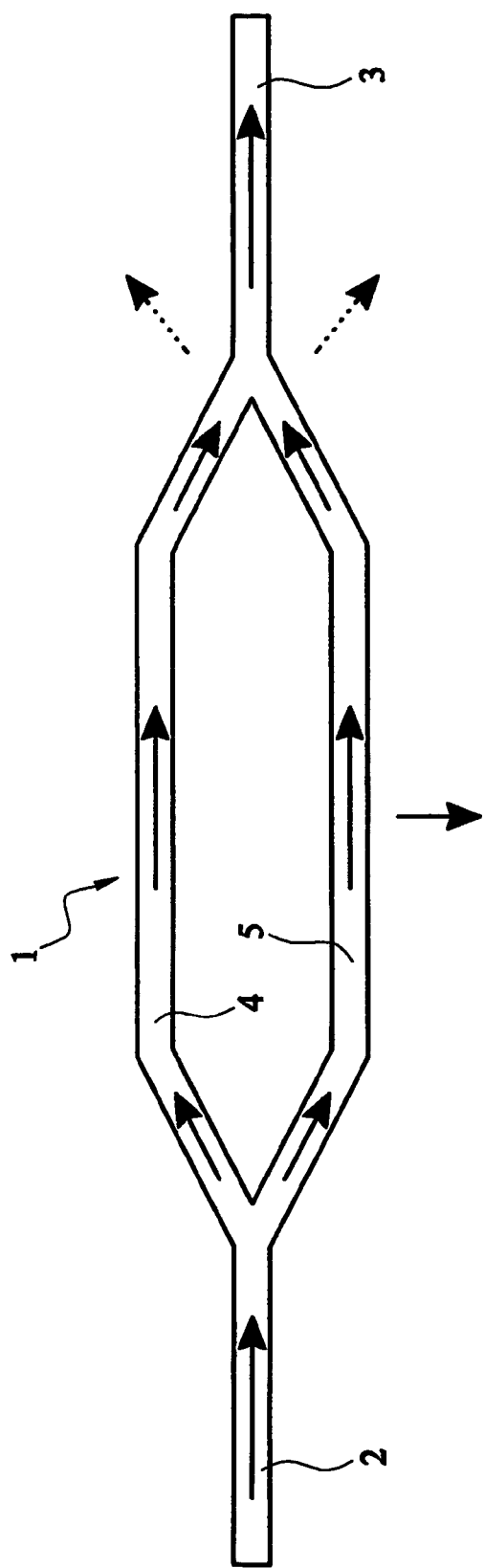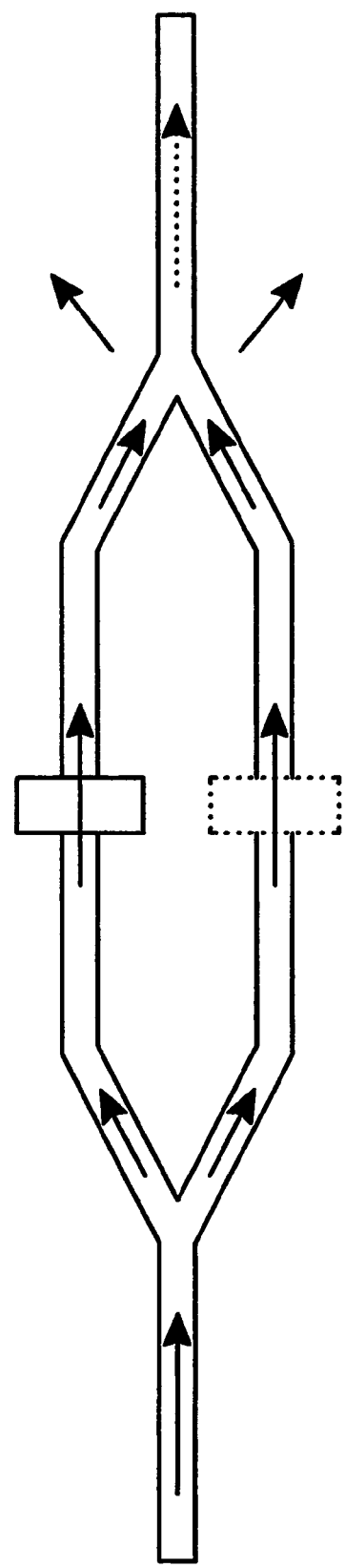
FIG. 1a
FIG. 1b

COPLANAR WAVEGUIDE LINE

The subject patent application claims priority to and all the benefits of International Application No. PCT/GB2004/004515, which was filed on Oct. 27, 2004 with the World Intellectual Property Organization.

The present invention relates to a coplanar waveguide line. The present invention also relates to a Mach-Zehnder modulator including such a coplanar waveguide line.

The use of Mach-Zehnder modulators as attenuators of optical signals is well known. IEEE Transactions on Microwave Theory and Techniques, Volume 47, No. 7, July 1999 provides a background review of the operation of such devices.

The bandwidth of such a modulator is inversely proportional to the mismatch in propagation speed between lightwaves and microwaves through the device. Typically, when using substrates such as gallium arsenide one tries to slow the speed of the microwaves to match the speed of the lightwaves to broaden the bandwidth of the device. With a lithium niobate substrate one does the reverse.

Known coplanar waveguide lines comprise a central electrode strip and first and second electrode strips, one on each side to the central electrode strip. In use the first and second electrode strips have the same polarity which is opposite to that of the central electrode strip. T-rails extend from both sides of the central strip into proximity with first and second optical waveguides to provide the slow wave effect.

Such coplanar waveguides are generally used with undoped epitaxial layers. This has the advantage of very low microwave loss. However, the driving voltage must be high due to the poor overlap between the lightwaves and microwaves.

Asymmetric coplanar strip lines are also used as slow wave structures. Asymmetric coplanar strips lack a central electrode strip. The optical waveguides are disposed between first and second parallel electrode strips which in use have opposite polarities. T-rails extend from the strips to the waveguides.

Unlike with coplanar waveguide lines, asymmetric coplanar strips are used on substrates including an $n^+$ electrically conducting layer extending between the waveguides. Use of a conducting layer reduces the driving voltage but increases the microwave loss.

It is known in the art not to include $n^+$ conducting layers in the epitaxial layers of coplanar waveguides. Whilst this improves the overlap between the lightwaves and microwaves (so reducing driving voltage) this results in excessive capacitance making true push/pull operation impossible.

Accordingly, in a first aspect, the present invention provides a coplanar waveguide line comprising
  a substrate;
  a central electrode strip on the substrate;
  first and second electrode strips disposed on opposite sides of the central electrode strip and extending parallel thereto;
  first and second optical waveguides on the substrate, the optical waveguides being positioned between the first and central electrode strips and extending parallel thereto;
  the central electrode comprising at least one T-rail extending proximate to the first optical waveguide;
  the first electrode comprising at least one T-rail extending proximate to the second optical waveguide;
  the substrate comprising an $n^+$ electrically conducting layer extending between the optical waveguides;
  wherein the coplanar waveguide line further comprises an electrical connection between first and second electrode strips.

The coplanar waveguide according to the invention has the advantage that it combines the low microwave loss of known coplanar waveguides with the lower driving voltage of asymmetric coplanar strips in combination with the conducting $n^+$ layer. In addition, since T-rails are only added on one side of the central electrode, capacitance can be halved giving greater freedom for transmission line design and making the transmission line applicable for MMIC transmission line design.

In addition it is known that there is discontinuity at the transmission between coplanar waveguides and asymmetric coplanar strips or vice versa. This can often restrict the choice of whether a coplanar waveguide or asymmetric coplanar strip should be used during design of a device. No such discontinuities exist between the coplanar waveguide line of the invention and known waveguide structures.

Preferably, the electrical connection between first and second electrode strips is an airbridge. The electrical connection can be wire bonded between the first and second electrode strips. The electrical connection between the first and second electrodes can extend through the back of the substrate. Such means of connection provide reliable and relatively straightforward means of connecting the first and second electrode strips.

Preferably, the coplanar waveguide line comprises a plurality of electrical connections between first and second electrode strips, the electrical connections preferably being equally spaced. Such multiple connections minimise the effects of unbalanced loading of the capacitance of the coplanar waveguide.

Preferably, at least one of the central electrode strip and first electrode strip comprise a plurality of T-rails, preferably equally spaced.

The T-rail can comprise a contact pad connected to the corresponding electrode strip by a bridge. Preferably, the contact pad abuts the optical waveguide. This ensures good overlap between lightwaves and microwaves.

The substrate can comprise a first isolation trench which extends through the $n^+$ electrically conducting layer between the first electrode strip and optical waveguides. The substrate can comprise a second isolation trench extending through the $n^+$ electrically conducting layer between the central electrode strip and the optical waveguides. The substrate can comprise a third isolation trench extending through the $n^+$ electrically conducting layer between the central electrode strip and the second electrode strip.

In a further aspect of the invention there is provided a Mach-Zehnder modulator including a coplanar waveguide according to the invention.

The present invention will now be described by way of example only, and not in any limitative sense with reference to the accompanying drawings in which FIGS. 1a and 1b show a schematic view of a Mach-Zehnder modulator;

Figure 2:
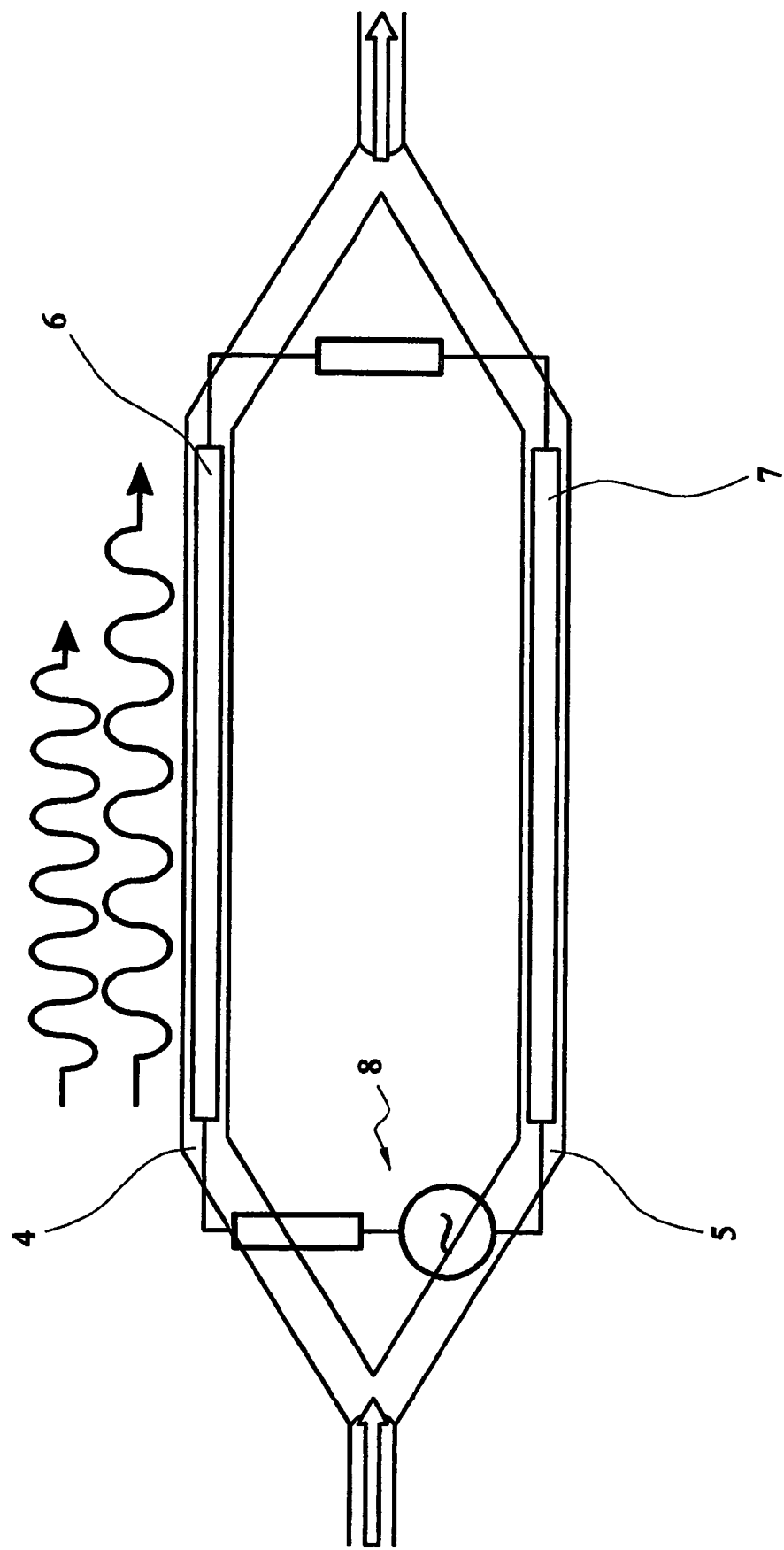
FIG. 2 shows a further schematic view of a Mach-Zehnder modulator and accompanying electrode strips.

Shown in FIG. 1 in schematic form is a Mach-Zehnder modulator (1). The Mach-Zehnder modulator (1) comprises input and output optical waveguides (2,3) and two optical paths (4,5) extending therebetween. The two optical paths (4,5) are of substantially equal length.

In use, a coherent light beam is inserted into the Mach-Zehnder modulator (1). The beam is split into approximately equal halves which travel down the two separate paths (4,5) to the output waveguide (3). The light beams re-combine in the output waveguide (3) before exiting the device. Assuming the two paths are of equal length then when the two beams re-combine they are in phase and the resulting output beam is of the same intensity as the input beam.

If one introduces a phase shift into one of the arms (4,5) of the Mach-Zehnder modulator (1) (as shown in FIG. 1b) then when the two beams re-combine they are slightly out of phase. This results in a reduction in the intensity of the output beam as shown.

A common method of introducing a phase shift into the arms (4,5) of a Mach-Zehnder modulator is shown in schematic form in FIG. 2. In close proximity to each of the arms (4,5) of the Mach-Zehnder modulator (1) is a conducting electrode strip (6,7). A microwave generator (8) is connected to the electrode strips (6,7) and the resulting electromagnetic fields generated interact with light passing through the arms (4,5) so altering the phase of the light. As shown, it is usual to connect the electrode strips (6,7) in a push/pull configuration such that the voltage applied to the two electrode strips (6,7) is 180 degrees out of phase. This maximises the phase changing effect of the electro magnetic waves.

The bandwidth of the Mach-Zehnder modulator (1) is limited by the mismatch of the propagation speed between the microwaves along the electrode strips (6,7) and lightwaves along the arms (4,5) of the Mach-Zehnder modulator (1). The bandwidth is given by the formula $$\Delta f_{3dB/TT} = \frac{1.4 c_{ph}}{\pi (n_{opt} - n_{mw}) L_T}$$

For GaAs, $n_{opt} \approx 2.64$, $n_{mw} \approx 3.34$ and $L_T = 0.01$ meter, resulting in a 3 dB bandwidth of $\approx 19$ GH$_z$ In order to overcome this problem and to broaden the bandwidth of the Mach-Zehnder modulator (1) one typically attempts to reduce the speed of propagation of the microwaves through the device. There are essentially two forms of known slow waveguide structure—the coplanar waveguide line (9) and the asymmetric coplanar strip line (10).

Figure 3:
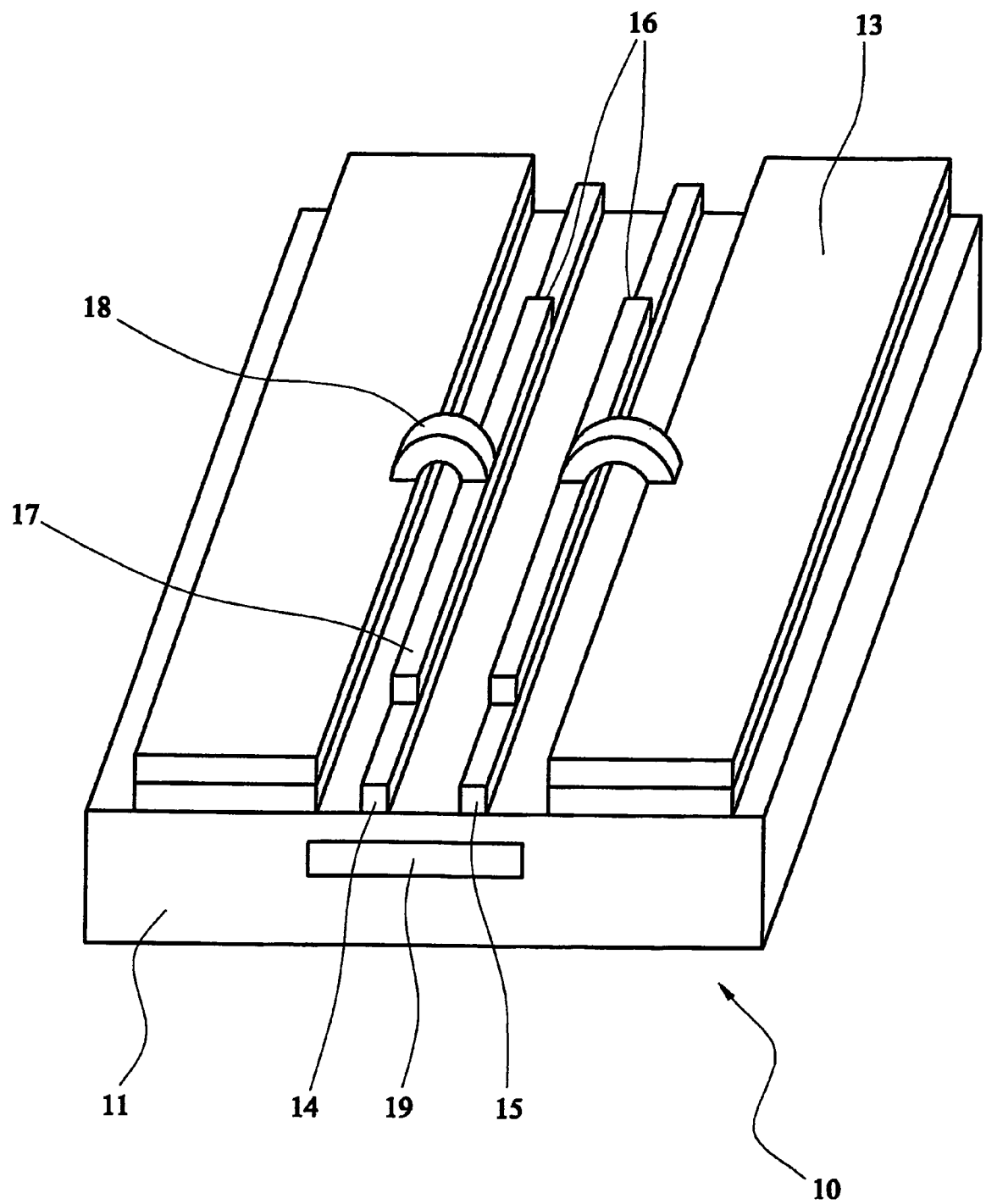
FIG. 3 shows a known asymmetric coplanar strip in perspective view.

Shown in FIG. 3 in perspective view is an known asymmetric coplanar strip (ACPS)(10). The ACPS (10) comprises a substrate (11) having positioned thereon first and second strip electrodes (12,13). Positioned between the strip electrodes (12,13) and extending parallel thereto are first and second optical waveguides (14,15). T-rails (16) extend from the strip electrodes (12,13) into proximity with the optical waveguides (14,15). Each T-rail (16) comprises a contact pad (17) which abuts the optical waveguide (14,15) and an airbridge (18) extending between contact pad (17) and corresponding strip electrode (12,13).

Figure 4:
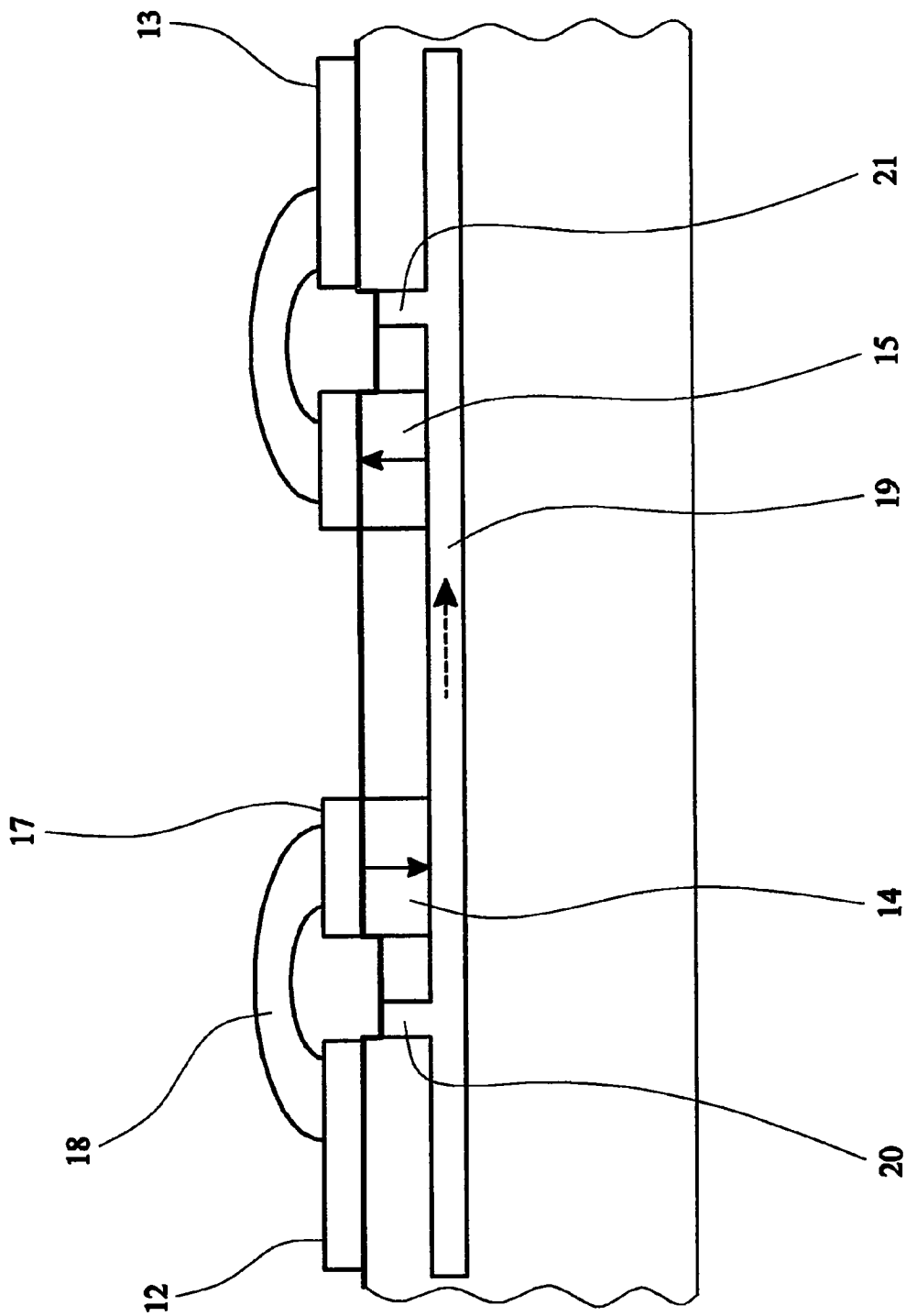
FIG. 4 shows the asymmetric coplanar strip of FIG. 3 in cross section.

Positioned within the substrate (11) is an n$^+$ conducting layer (19). As can be seen in FIG. 4, the n$^+$ conducting layer (19) extends between the optical waveguides (14,15) providing an electrical connection therebetween. Isolation trenches (20,21) extend through the n$^+$ conducting layer (19) at the sides of the optical waveguides as shown. The n$^+$ conducting layer (19) extends beneath the electrode strips (12,13).

Figure 5:
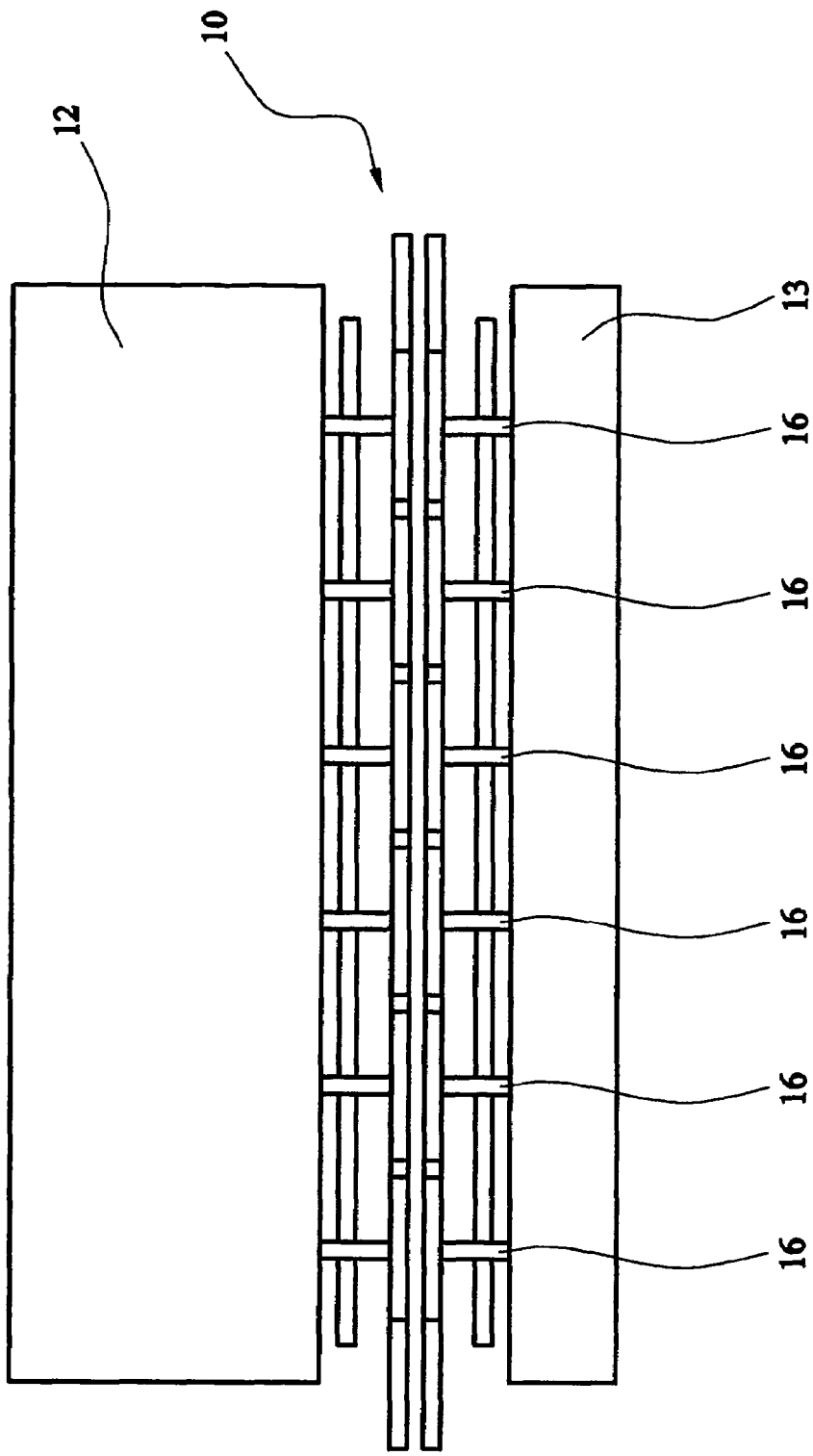
FIG. 5 shows the asymmetric coplanar strip of FIGS. 3 and 4 in plan view.

FIG. 5 shows the asymmetric coplanar strip (10) of FIGS. 3 and 4 in plan view. Both electrode strips (12,13) comprise a plurality of T-rails (16) extending to the associated optical waveguide (14,15). The T-rails (16) are equally spaced. The T-rails (16) slow the microwaves, increasing bandwidth.

Due to the presence of the n$^+$ conducting layer (19) asymmetric coplanar strips (10) only require a low driving voltage. However, they tend to have poor microwave loss characteristics.

Figure 6:
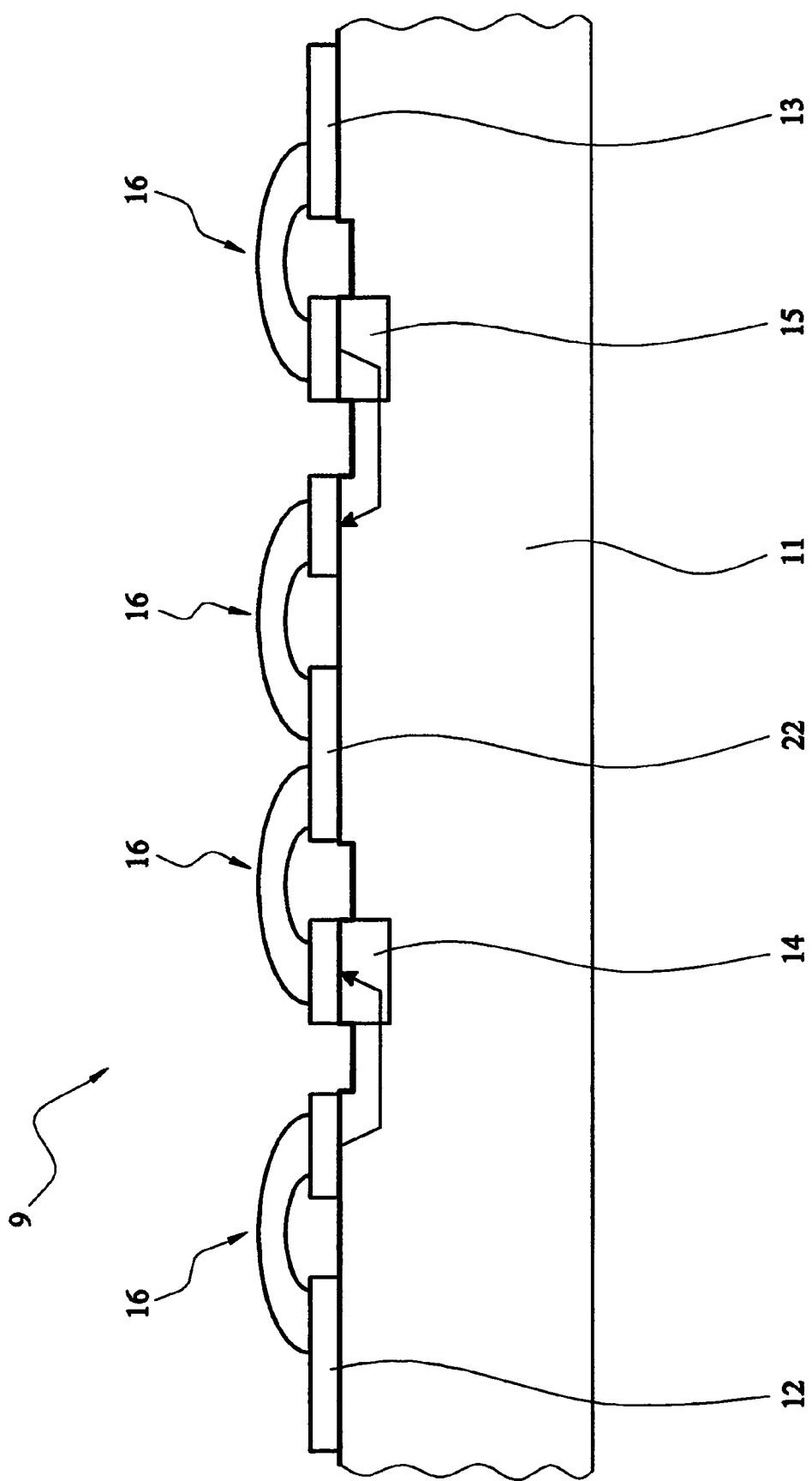
FIG. 6 shows a known coplanar waveguide strip in cross section.

Shown in FIG. 6 in cross section is a known coplanar waveguide line (9). The coplanar waveguide line (9) comprises a GaAs substrate (11). Positioned on the substrate (11) is a central electrode strip (22) having first and second electrode strips (12,13) arranged on the opposite side thereof. First and second optical waveguides (14,15) are positioned between the first (12) and central (22) and central (22) and second (13) electrode strips respectively. T-rails (16) extend from both sides of the central electrode strip (22) and also both first and second electrode strips (12,13). T-rails (16) from the second electrode strip (13) and the central electrode strip (22) abut the optical waveguides (14,15) as shown. The GaAs substrate (11) does not include an n$^+$ conducting layer.

Due to the absence of a n$^+$ conducting layer, a coplanar waveguide line (9) has a very low microwave loss. However, the driving voltages must be quite high due to the bad overlap between lightwaves and microwaves.

Figure 7:
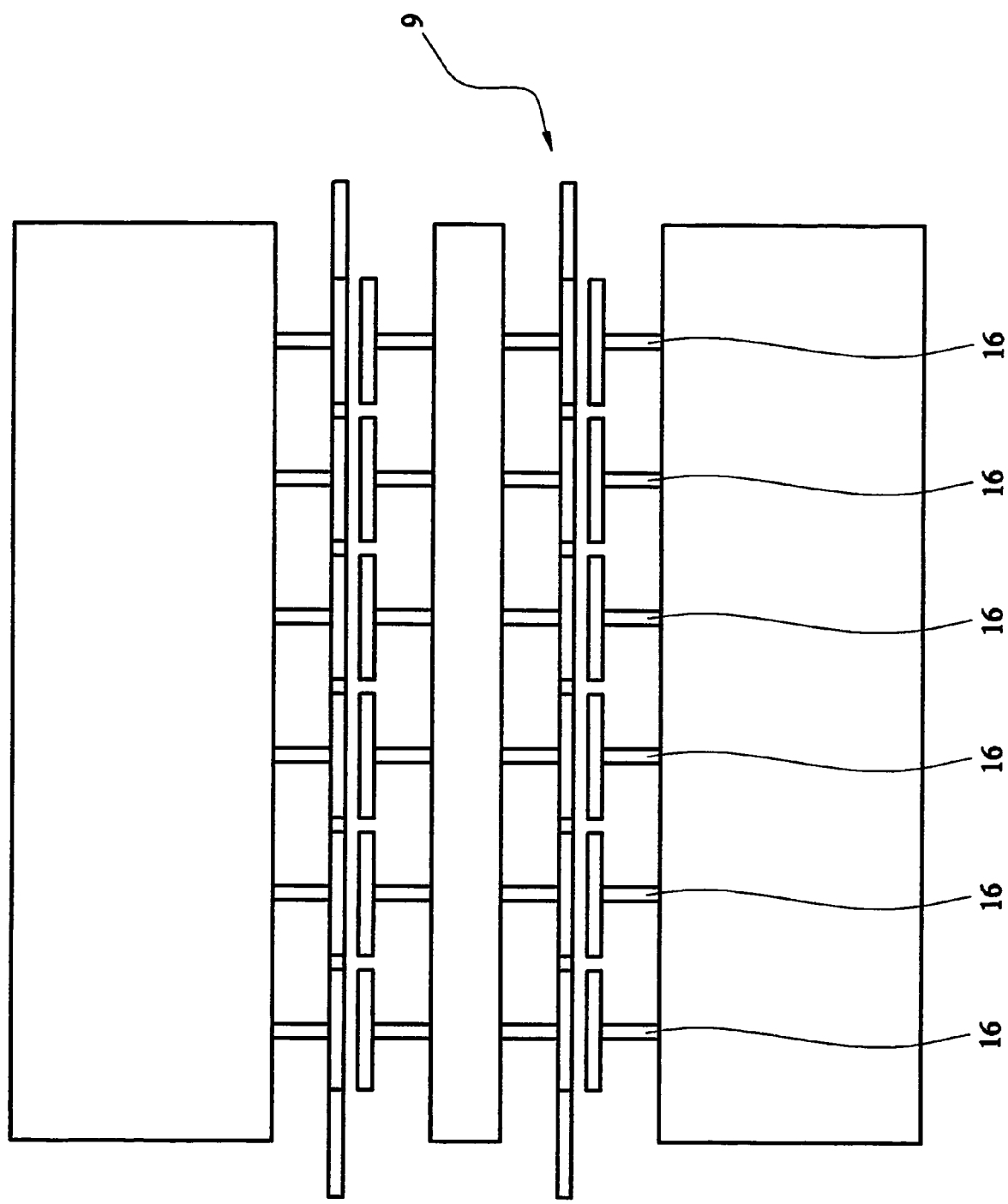
FIG. 7 shows the coplanar waveguide strip of FIG. 6 in plan view.

The coplanar waveguide line (9) is shown in plan view in FIG. 7 showing the repeating nature of the T-rails (16).

Figure 8:
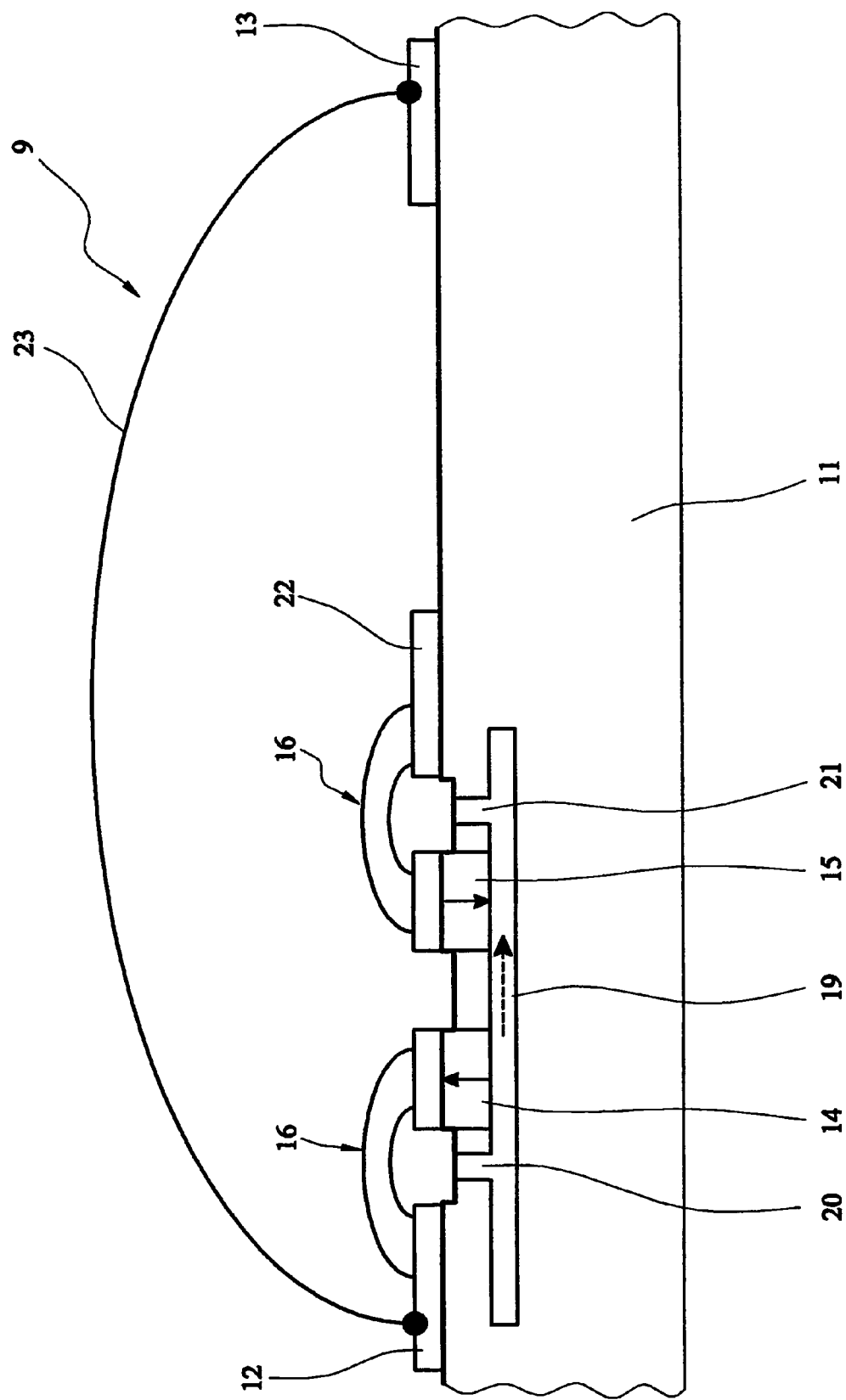
FIG. 8 shows a first embodiment of a coplanar waveguide line according to the invention in cross section.

Shown in FIG. 8 is a coplanar waveguide line (9) according to the invention in cross section. The coplanar waveguide line (9) comprises a GaAs substrate (11) having an n$^+$ conducting layer (19) embedded therein. Positioned on the substrate (11) are a central electrode strip (22) and first and second electrode strips (12,13) one on each side of the central electrode strip (22) and extending parallel thereto. Two parallel optical waveguides (14,15) are positioned between the first electrode strip (12) and central electrode strip (22) and extend parallel thereto. T-rails (16) extend from the first (12) and central (22) electrode strips to the optical waveguides (14,15) as shown. A conducting n$^+$ layer (19) extends underneath the two optical waveguides (14,15). First and second isolation trenches (20, 21) extend through the n$^+$ layer (19) on each side of the optical waveguides (14,15) as shown. The first and second electrode strips (12,13) are electrically connected together by wire bonding (23). In a further embodiment (not shown) the first and second electrode strips (12,13) are connected by airbridges.

Figure 9:
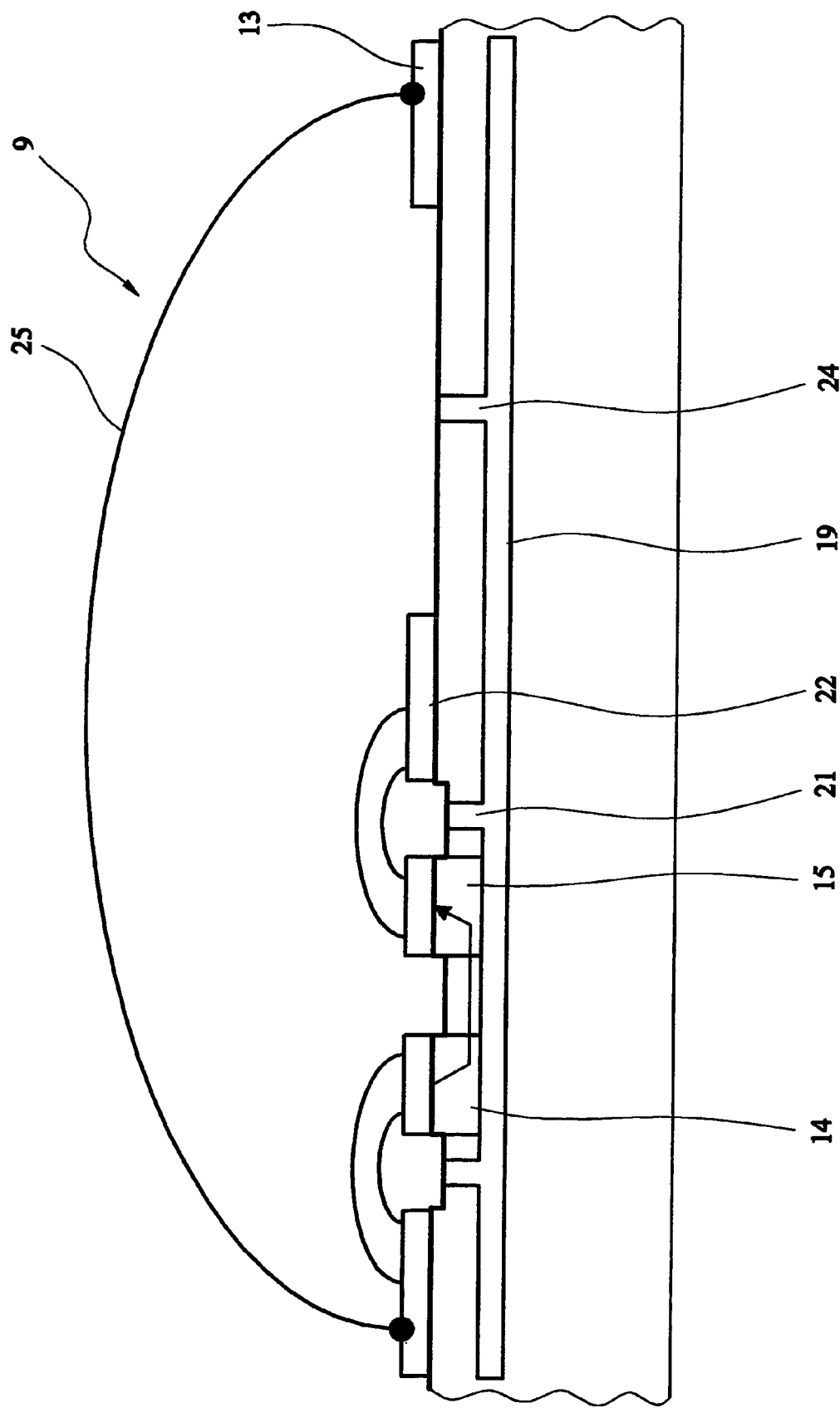
FIG. 9 shows a second embodiment of a coplanar waveguide line according to the invention in cross section.

A further embodiment of a coplanar waveguide line (9) according to the invention is shown in FIG. 9. The coplanar waveguide line (9) in this embodiment is similar to that of the previous embodiment except the n$^+$ conducting layer (19) extends from underneath the central electrode strip (22) to the second electrode strip (13) as shown. As with the previous embodiment however this extension of the n$^+$ conducting layer (19) is separated from the n$^+$ layer (19) under the optical waveguides (14,15) by the second isolation trench (21). A third isolation trench (24) extends through the n⁺ conducting layer (19) between the second (13) and central (22) strip electrodes.

Figure 10:
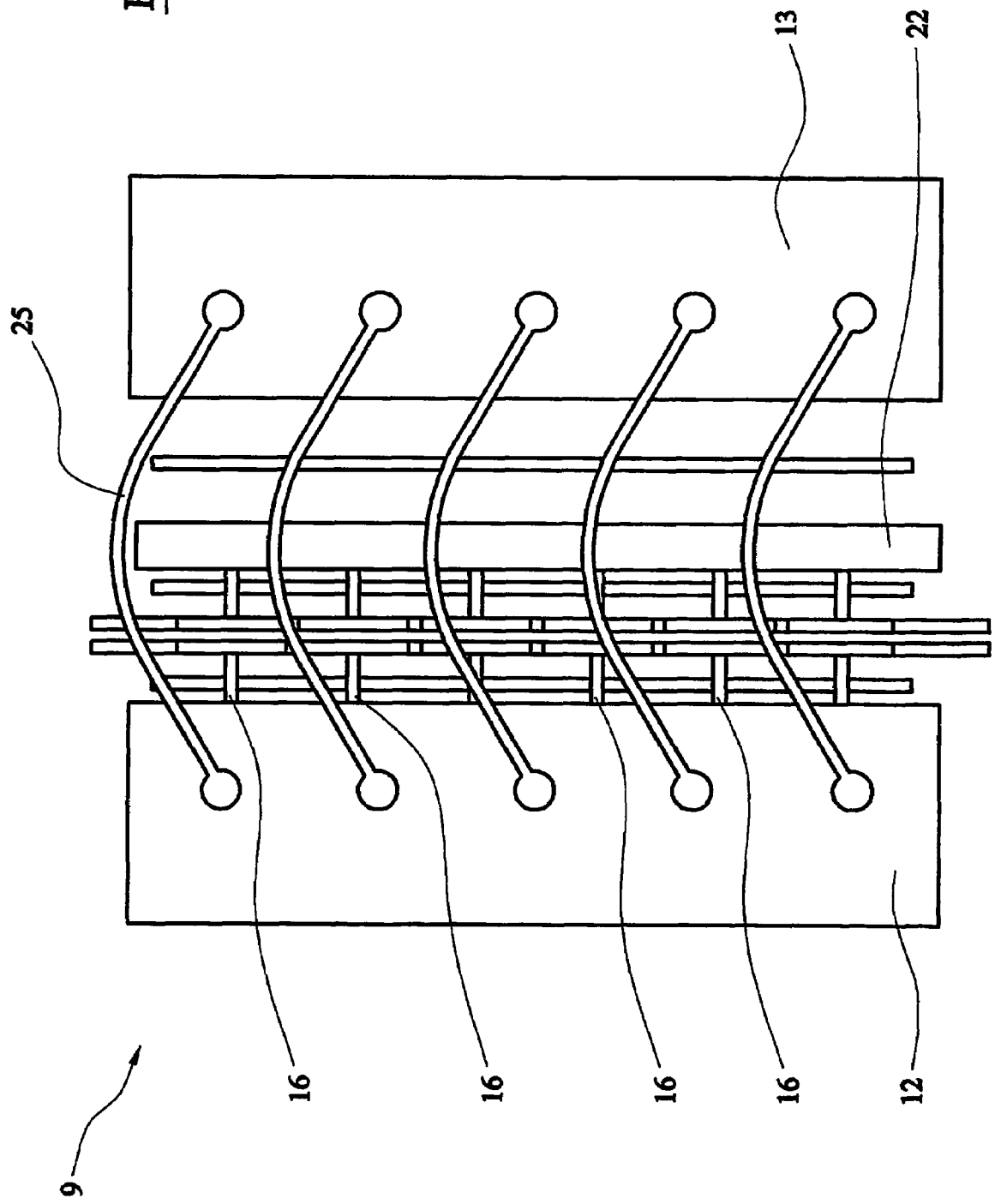
FIG. 10 shows the coplanar waveguide line of FIG. 9 in plan view.

Shown in FIG. 10 is the coplanar waveguide line (9) of FIG. 9 in plan view. This figure shows the repeating nature of the T-rails (16) along the electrode strips (12,22). The first and second electrode strips (12,13) are electrically connected by a plurality of air bridges (25), the air bridges (25) are substantially equally spaced. In an alternative embodiment the first and second electrode strips (12,13) are electrically connected by wire bonding (23).

Figure 11:
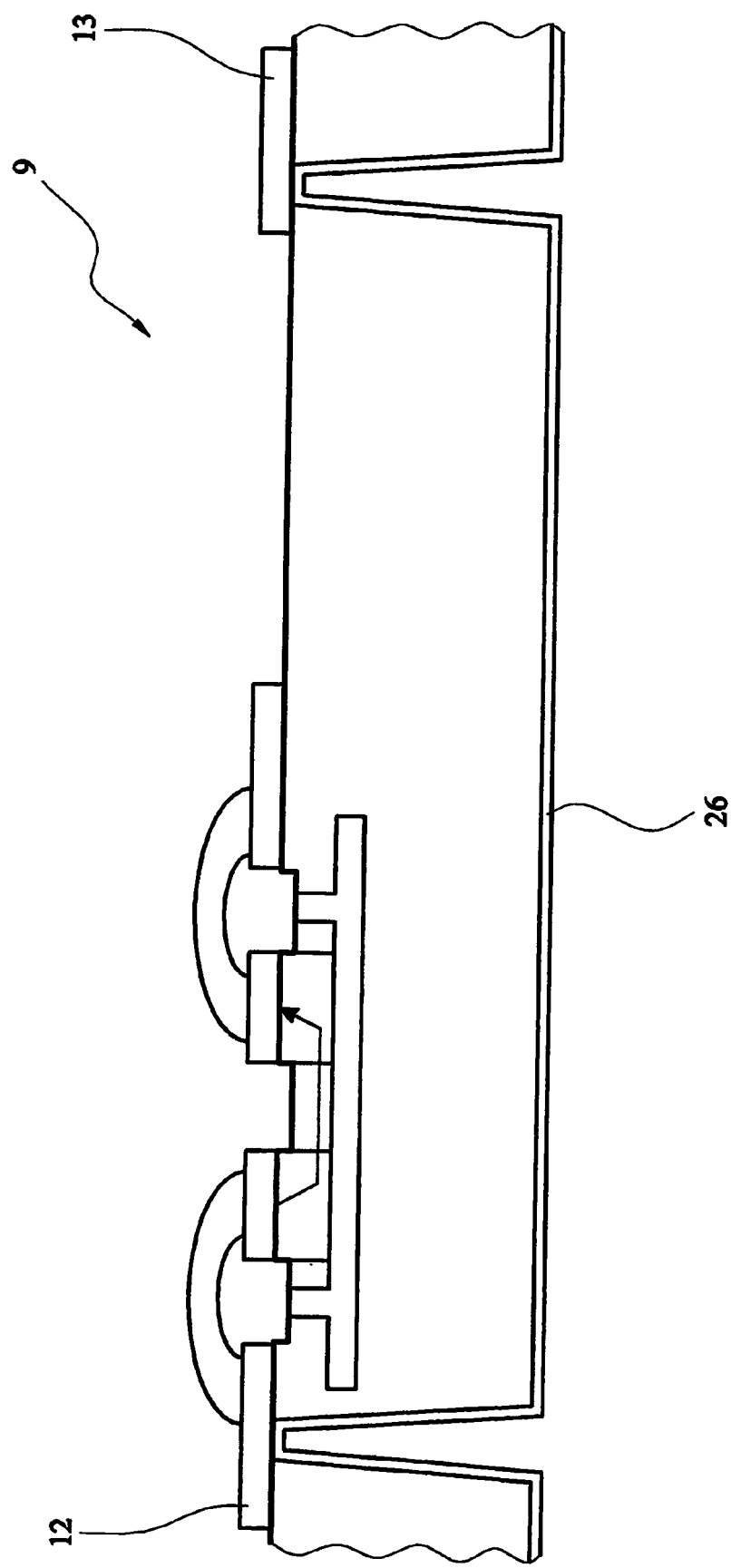
FIG. 11 shows a further embodiment of a coplanar waveguide line according to the invention.

Shown in FIG. 11 is a further embodiment of a coplanar waveguide line (9) according to the invention in cross section. This embodiment is similar to that shown in FIG. 8 except the first and second electrode strips (12,13) are connected by electrical connections (26) which extend through the substrate.

Figure 12:
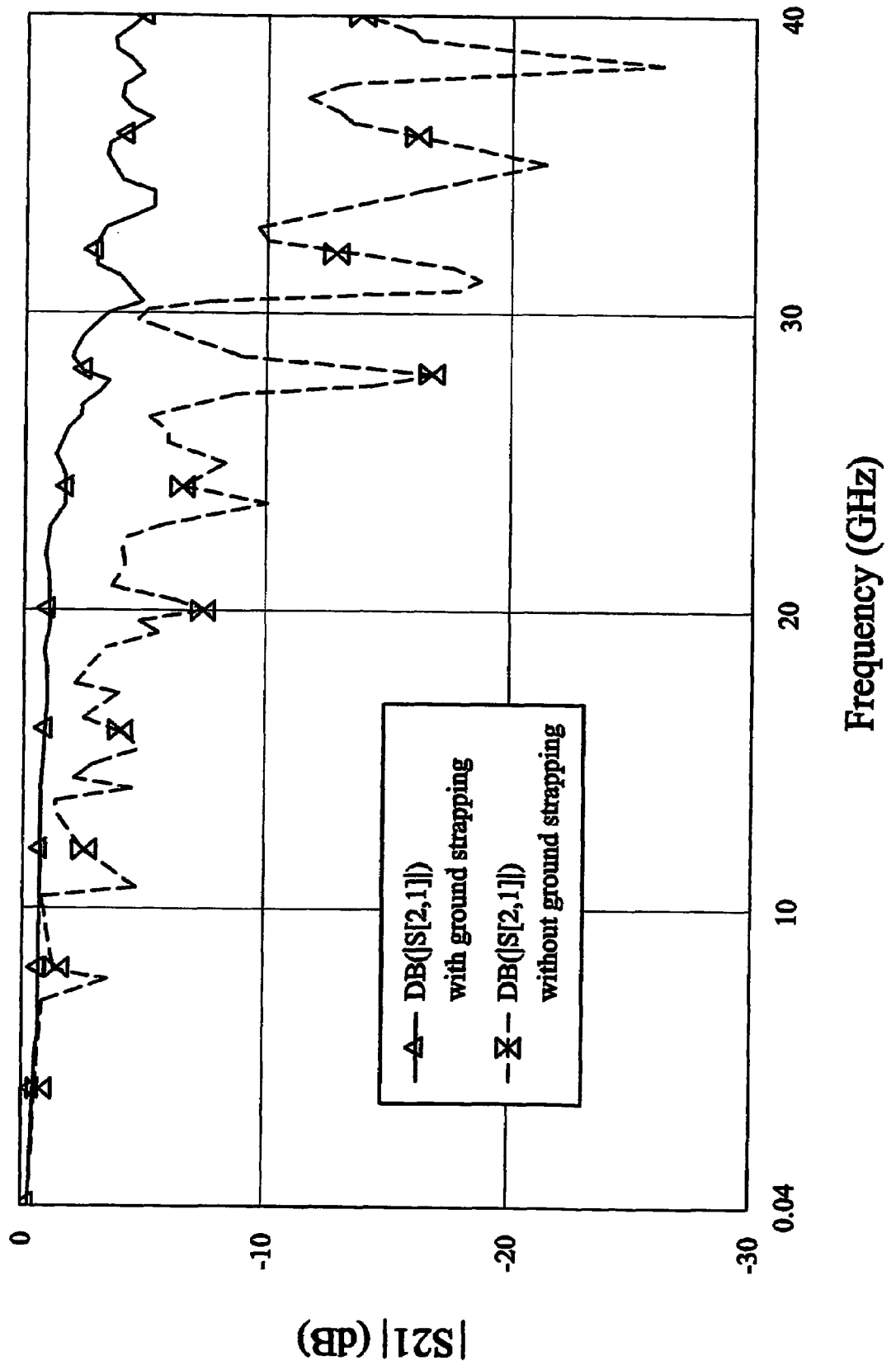
FIGS. 12 and 13 show performance data for the coplanar waveguide line according to the invention.
Figure 13:
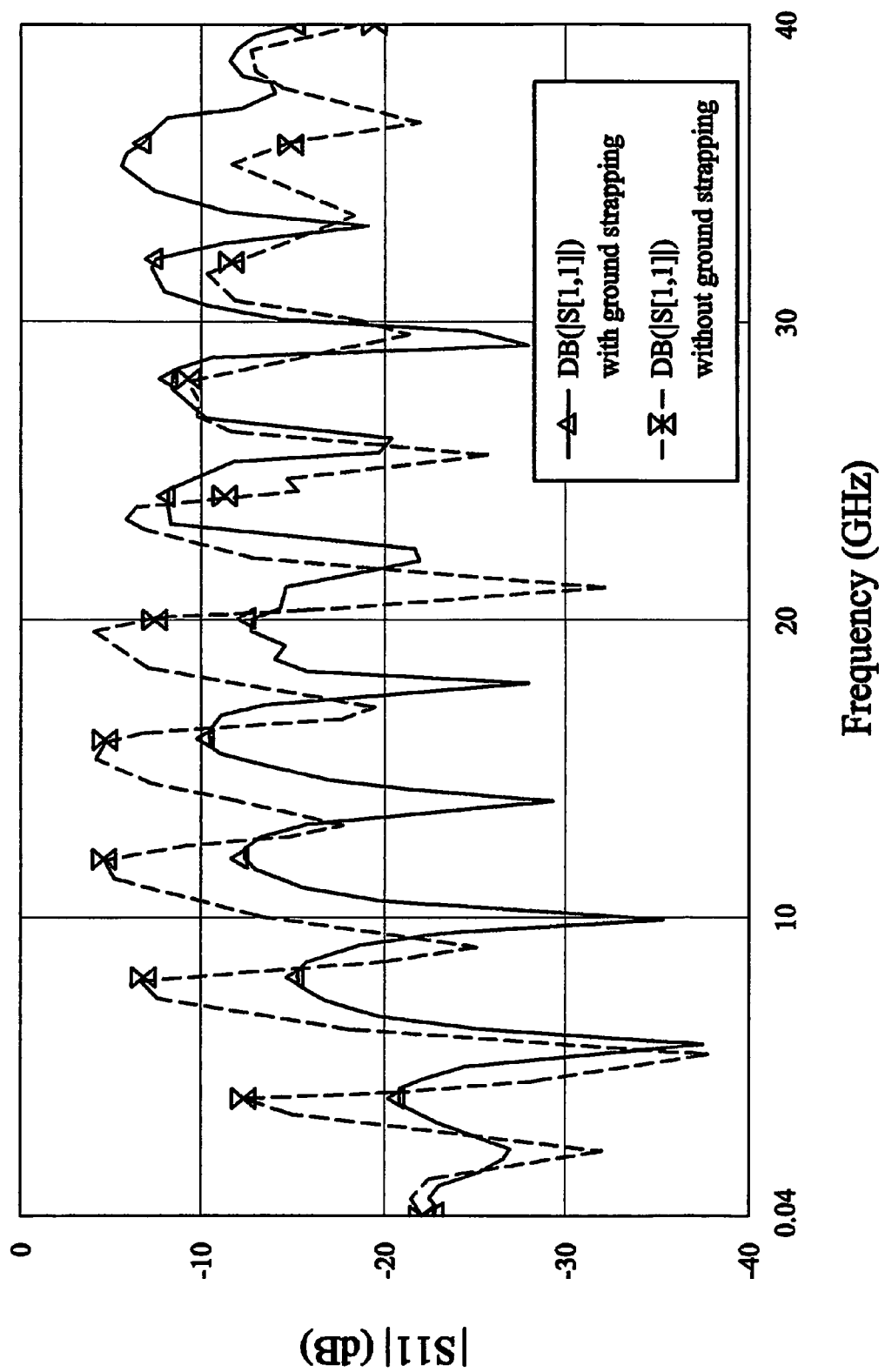

Shown in FIGS. 12 and 13 are data relating to the performance of the coplanar waveguide line according to the invention.

The magnitude of S21 and S11 of the measured S-parameters on a coplanar waveguide line are shown in FIGS. 12 and 13 respectively. In FIG. 12 and FIG. 13, the large difference between two plots is attributed to presence of absence of ground strapping. In FIG. 13, strong resonances appear regularly in S11 spectrum for a CPW without ground strapping when the frequency is increased. These resonances correspond to the ripples in the S21 spectrum for the CPW shown in FIG. 12. The resonances disappeared after the strapping between the first and second electrode strips have been done. Smooth responses up to 30 Ghz on S21 and low reflection on S11 have been realised with the use of ground strapping.

The electrical contacts extending between first and second strip electrodes (12,13) eliminate any unbalanced performance of the coplanar waveguide line due to asymmetric capacitive loading of the central electrode strip (22).

The coplanar waveguide line (9) of the invention has a number of advantages over known coplanar waveguide lines and asymmetric coplanar strips. Since only one side of the central electrode strip (22) is capacitively loaded with T-rails (16) this gives a greater choice of transmission line design and makes the line applicable for MMIC transmission line design. In addition, the coplanar waveguide line (9) has low microwave loss coupled with the advantage of low driving voltage and high speed. There is also no restriction as to when choices should be made between coplanar waveguide and asymmetric coplanar strips on doped or un-doped epitaxial layers.

The invention claimed is:

1. A coplanar waveguide line comprising:
a substrate;
a central electrode strip on the substrate;
first and second electrode strips disposed on a surface of the substrate and on opposite sides of the central electrode strip and extending parallel thereto;
first and second optical waveguides on the substrate, the optical waveguides being positioned between the first and central electrode strips and extending parallel thereto;
the central electrode comprising at least one T-rail extending proximate to the first optical waveguide;
the first electrode comprising at least one T-rail extending proximate to the second optical waveguide;
the substrate comprising an n⁺ electrically conducting layer extending between the optical waveguides;
wherein the coplanar waveguide line further comprises an electrical connection between first and second electrode strips.

2. A coplanar waveguide line as claimed in claim 1, wherein the electrical connection between first and second electrode strips is an airbridge.

3. A coplanar waveguide line as claimed in claim 1, wherein the electrical connection is wire bonded between the first and second electrode strips.

4. A coplanar waveguide line as claimed in claim 1, wherein the electrical connection between first and second electrodes extends through the back of the substrate.

5. A coplanar waveguide line as claimed in claim 1, comprising a plurality of electrical connections between first and second electrode strips, the electrical connections preferably being equally spaced.

6. A coplanar waveguide line as claimed in claim 1, wherein at least one of the central electrode strip and first electrode strip comprises a plurality of T-rails, preferably equally spaced.

7. A coplanar waveguide line as claimed in claim 1, wherein the T-rail comprises a contact pad electrically connected to the corresponding electrode strip by an airbridge.

8. A coplanar waveguide line as claimed in claim 7, wherein the contact pad abuts the optical waveguides.

9. A coplanar waveguide line as claimed in claim 1, wherein the substrate comprises a first isolation trench which extends through the n⁺ electrically conducting layer between the first electrode strip and optical waveguides.

10. A coplanar waveguide line as claimed in claim 9, wherein the substrate comprises a second isolation trench extending through the n⁺ electrically conducting layer between the central electrode strip and the optical waveguides.

11. A coplanar waveguide line as claimed in claim 10, wherein the substrate comprises a third isolation trench extending through the n⁺ electrically conducting layer between the central electrode strip and the second electrode strip.

12. A Mach-Zehnder modulator including a coplanar waveguide line as claimed in claim 1.

* * * * *